United States Patent

Ogawa et al.

[11] Patent Number: 5,459,706
[45] Date of Patent: Oct. 17, 1995

[54] METHOD AND APPARATUS FOR DETECTING A SIGNAL

[75] Inventors: Hiroshi Ogawa; Shinichiro Iimura, both of Kanagawa, Japan

[73] Assignee: Sony Corporation, Japan

[21] Appl. No.: 220,298

[22] Filed: Mar. 31, 1994

[30] Foreign Application Priority Data

Apr. 5, 1993 [JP] Japan ................................ 5-102008

[51] Int. Cl.⁶ .................................................. G11B 7/00
[52] U.S. Cl. ..................... 369/54; 369/44.13; 369/124
[58] Field of Search ............................ 369/44.13, 47, 369/50, 54, 58, 111, 124

[56] References Cited

U.S. PATENT DOCUMENTS 4,942,565  7/1990  Lagadec .................... 369/59
4,967,404  10/1990  Orlicki et al. .
5,185,732  2/1993  Ogawa et al. ................ 369/47
5,339,302  8/1994  Takahashi et al. ............ 369/124 X

FOREIGN PATENT DOCUMENTS

0457567A3  11/1991  European Pat. Off. .
0530023A2  3/1993   European Pat. Off. .
0580419A2  1/1994   European Pat. Off. .

Primary Examiner—W. R. Young
Attorney, Agent, or Firm—Limbach & Limbach; Philip M. Shaw, Jr.

[57] ABSTRACT

Outputs of first and second photodetectors are supplied to first and second normalizing circuits and are also added by an adding circuit. An output of the adding circuit is supplied to the normalizing circuits. By the output supplied from the adding circuit to the normalizing circuits, the outputs supplied from the photodetectors to the normalizing circuits are normalized. A subtraction is performed between the outputs of the normalizing circuits by a subtracting circuit.

6 Claims, 3 Drawing Sheets

METHOD AND APPARATUS FOR DETECTING A SIGNAL

BACKGROUND OF THE INVENTION

1. Field of the Invention

The present invention relates to signal detecting method and apparatus for processing a reproduction signal from an optical disc in which additional information such as an address or the like is recorded by wobbling a groove for tracking and, more particularly, to a signal detecting method and apparatus which can accurately detect Additional information from the optical disc.

2. Description of the Prior Art

A CD-R disc is known as a writable optical disc. In the CD-R disc, additional information such as an address or the like is recorded by wobbling a groove in advance. That is, for example, a carrier of a predetermined frequency (for example, 22.05 kHz) is modulated by additional information such as an address or the like. On the basis of the additional information modulated, the groove for tracking is wobbled.

The frequency of the signal which was wobble recorded as mentioned above is sufficiently higher than that of a tracking error signal. Therefore, by separating a predetermined frequency component from the tracking error signal, a wobble signal can be detected.

That is, for instance, a groove 51 is provided along a track on a writable optical disc such as a CD-R or the like as shown in FIG. 3. The groove 51 is wobbled on the basis of the additional information modulated. A deviation of the wobble is set to a small value of about 30 nm so as not to exert an influence on a signal component by a pit.

A two-divided detector comprising detectors 61a and 61b as shown in FIG. 4 is provided for such an optical disc. When a laser beam 53 is irradiated to the optical disc, the reflection light is supplied to the two divided detectors 61a and 61b. By performing a subtraction between outputs of the two divided detectors 61a and 61b, a tracking error signal is obtained. On the basis of the tracking error signal obtained as mentioned above, a tracking servo is performed.

Although the groove 51 has been wobbled, since a frequency of the wobble is enough. higher as compared with a frequency of the tracking error signal, the laser beam 53 doesn't trace along the groove wobbled but traces the center of the track as a whole.

When the laser beam 53 is allowed to trace along the track, a signal as shown in FIG. 5A is obtained from the detector 61a and a signal as shown in FIG. 5B is obtained from the detector 61b. When a subtraction is performed between the outputs of the detectors 61a and 61b and a tracking error signal component is eliminated from the subtracted value, a wobble signal as shown in FIG. 5C is detected. By demodulating the wobble signal, the additional information such as an address or the like can be obtained.

U.S. Pat. No. 4942565 discloses an optical disc apparatus using wobbling of tracks on which control information is recorded. Further, U.S. Pat. No. 5,185,732 discloses an optical disc apparatus in which information is recorded on tracks of an optical disc. Furthermore, U.S. patent application Ser. No. 095288 filed on Jul. 21, 1993 of the present applicant discloses an apparatus reproducing information recorded in a pre-groove.

When a signal is recorded in such an optical disc, pits 52a and 52b are arranged in the wobbled groove 51 wobbled. Conventionally, there is a problem such that, when such pits 52a and 52b are provided, in reproducing, signals of the pits 52a and 52b exert an influence on the wobble signal.

That is, inherently, the signal components of the pits ought to be cancelled by performing a subtraction between the outputs of the two detectors 61a and 61b. In order to raise a sensitivity of a focusing servo, however, a spot diameter of a laser beam is ordinarily converged to a small diameter of about 100 μm. When the spot diameter of the laser beam is converged as mentioned above, there is a case where a position of the laser beam for the detector is moved due to the temperature characteristics or the like. In this case, a difference of the signal levels of the two detectors 61a and 61b occurs, and as shown in FIG. 5C, a differential signal between the detectors 61a and 61b doesn't become a simple wobble component but includes influence portions 71a, 71b, and 71c influenced by the pits as shown in the hatched portions. When the signal components due to the influence by the pits remain, a problem occurs such that the detection of the wobble signal as a microdeviation becomes unstable. Although such an influence of the signal component is improved to a certain extent by a non-linear operation such as a peak holding or the like, since the pit is influenced by the optical diameter, it cannot be completely improved.

OBJECTS AND SUMMARY OF THE INVENTION

Therefore, it is an object of the invention to provide signal detecting method and apparatus which can certainly detect additional information such as an address or the like which was wobble recorded in a groove.

According to an aspect of the invention, there is provided a signal detecting method of detecting additional information of an optical disc which was wobble recorded on a track, wherein outputs of first and second photodetectors divided in the tangential direction of a track are added, thereby obtaining a reproduction RF signal, the outputs of the first and second photodetectors are normalized by the reproduction RF signal so as to reduce an influence by a recording signal, and a subtraction is performed between the normalized outputs of the first and second photodetectors, thereby obtaining the additional information of the optical disc which was wobble recorded.

According to another aspect of the invention, there is provided a signal detecting apparatus to detect additional information of an optical disc which was wobble recorded on a track, wherein the apparatus comprises: first and second photodetectors divided in the tangential direction of the track; adding means for adding outputs of the first and second photodetectors, thereby obtaining a reproduction RF signal; first and second normalizing means for normalizing the outputs of the first and second photodetectors by the reproduction RF signal so as to reduce the influence by a recording signal; and subtracting means for performing a subtraction between the outputs of the first and second photodetectors normalized by the first and second normalizing means, thereby obtaining the additional information of the optical disc which was wobble recorded.

Outputs of two photodiodes 1 and 2 (shown in FIG. 1) which construct a two-divided detector are normalized by normalizing circuits 8 and 9. Accordingly, a pit component which is included in an output signal on the photodiode 1 side and a pit component which is included in an output signal on the photodiode 2 side are equal. A subtraction is performed between the two pit components, thereby eliminating the pit signal component existing in a wobble signal component.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 1:
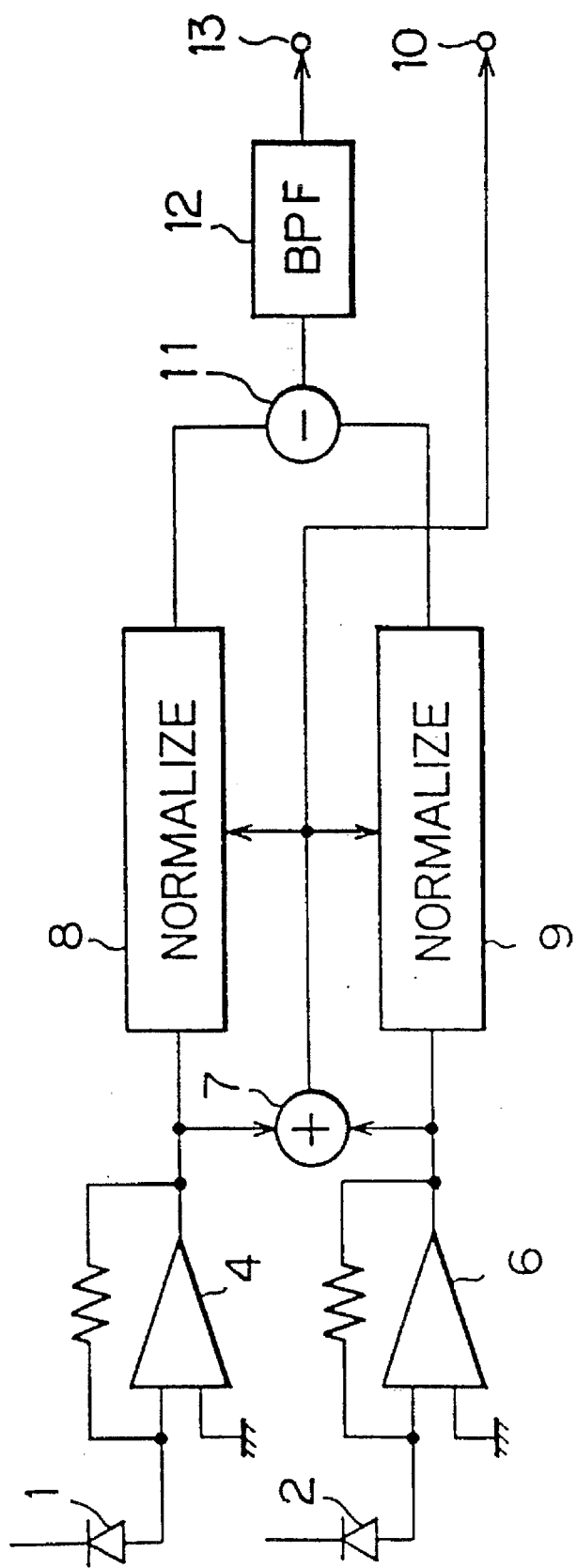
FIG. 1 is a block diagram of a signal detecting apparatus according to the invention.

An embodiment of the invention will now be explained hereinbelow with reference to the drawings. FIG. 1 shows a block diagram of a signal detecting apparatus according to the invention. In FIG. 1, photodiodes 1 and 2 construct a two-divided detector. A laser beam from a laser diode (not shown) is reflected by an optical disc (not shown) and a reflection light is received by the photodetectors 1 and 2 which construct the two-divided detector. The optical disc is, for example, a CD-R disc and additional information such as an address or the like is wobble recorded on a groove for tracking of the optical disc.

An output of the photodiode 1 is supplied to a head amplifier 4. An output of the photodiode 2 is supplied to a head amplifier 6. An output of the head amplifier 4 is supplied to an adding circuit 7 and also to a normalizing circuit 8. An output of the head amplifier 6 is supplied to the adding circuit 7 and also to a normalizing circuit 9. Outputs of the two photodetectors 1 and 2 are added by the adding circuit 7 and a reproduction RF signal is obtained from the adding circuit 7. The reproduction RF signal is outputted from an output terminal 10 and is also supplied to the normalizing circuits 8 and 9.

The normalizing circuits 8 and 9 normalize the output signals of the photodetectors 1 and 2 on the basis of the reproduction RF signal. Outputs of the normalizing circuits 8 and 9 are supplied to a subtracting circuit 11. A subtraction is performed between the normalized output signals of the photodetectors 1 and 2. When the subtraction is performed between the output signals of the two photodetectors 1 and 2 as mentioned above, a wobble signal component can be detected. An output of the subtracting circuit 11 is supplied to a band-pass filter 12. The band-pass filter 12 extracts a wobble signal component from the output signals of the two photodetectors 1 and 2. The wobble signal detected from the band-pass filter 12 is outputted and the wobble signal is extracted from an output terminal 13.

Figure 2:
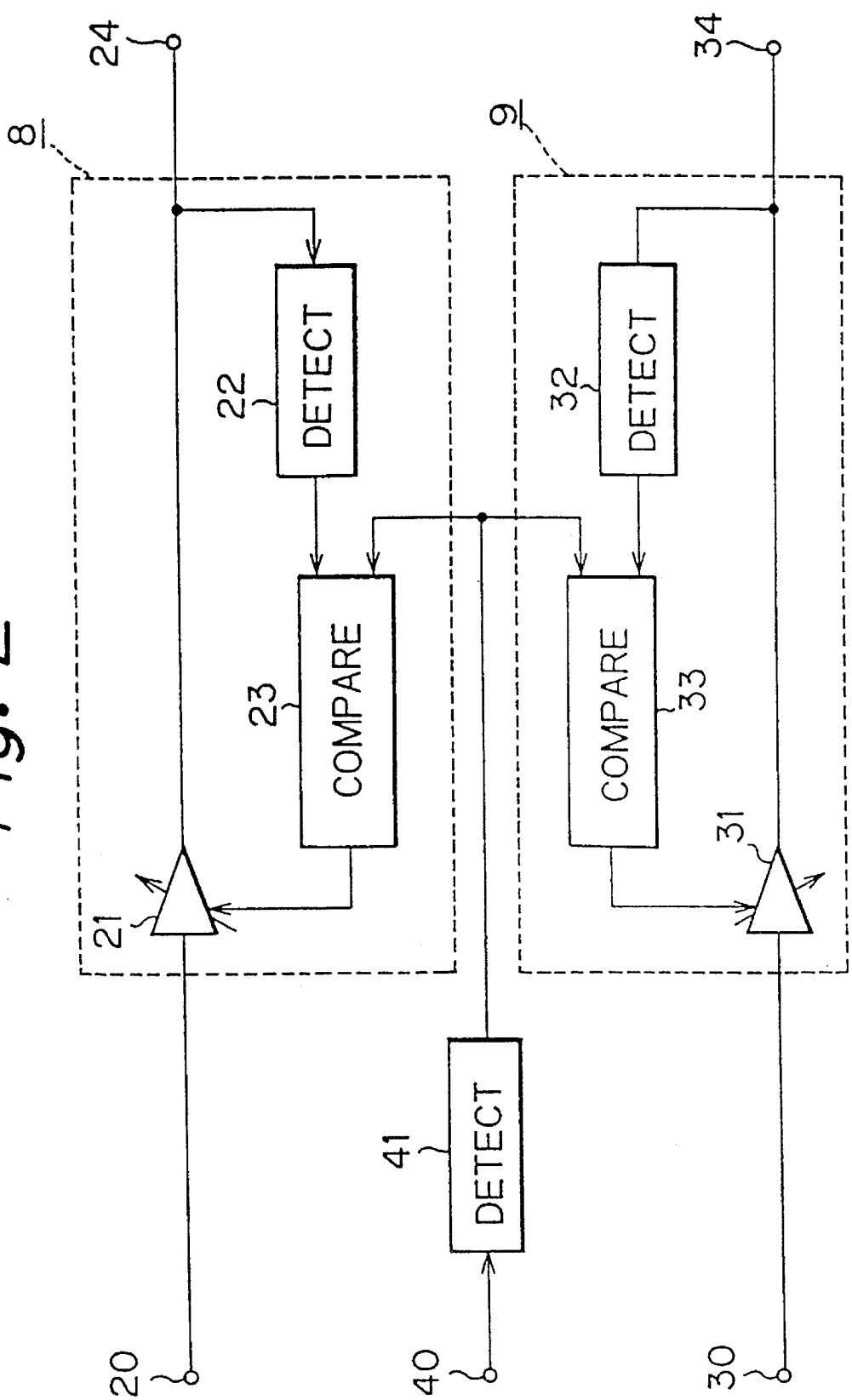
FIG. 2 is a circuit block diagram of an example of a normalizing circuit.
Figure 3:
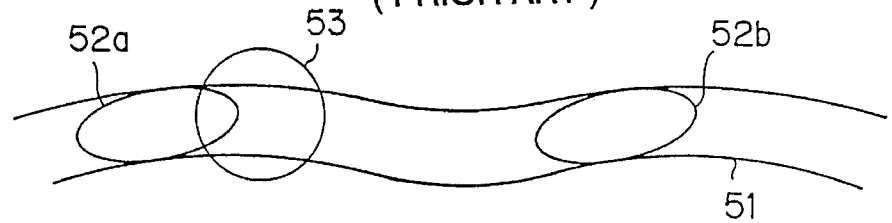
FIG. 3 is a diagram showing a groove on a disc.
Figure 4:
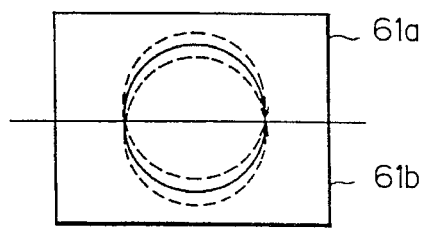
FIG. 4 is a diagram showing a two-divided detector.
Figure 5A:
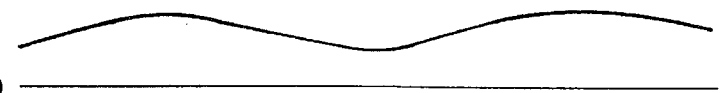
FIGS. 5A to 5C are waveform diagrams of signals which are outputted from the two-divided detector.
Figure 5B:
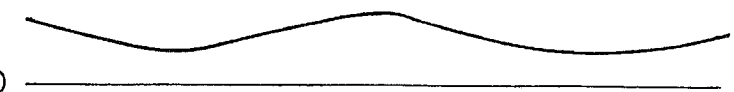
Figure 5C:
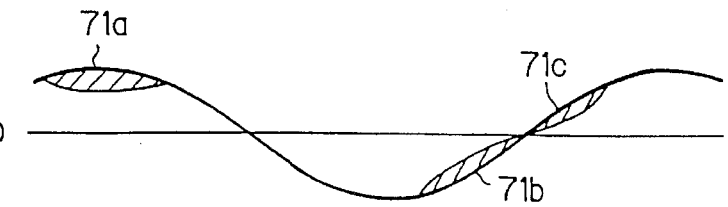

The normalizing circuits 8 and 9 are constructed, for example, as shown in FIG. 2. In FIG. 2, the normalizing circuit 8 comprises a variable gain amplifier 21, a detecting circuit 22, and a comparing circuit 23. The normalizing circuit 9 comprises a variable gain amplifier 31, a detecting circuit 32, and a comparing circuit 33.

An output of the photodiode 1 is supplied to an input terminal 20 through the head amplifier 4 in FIG. 1. An output of the variable gain amplifier 21 is outputted from an output terminal 24 and is also supplied to the detecting circuit 22. In the detecting circuit 22, an output signal level of the variable gain amplifier 21 is detected. An output of the detecting circuit 22 is supplied to the comparing circuit 23. The reproduction RF signal which was transmitted through a terminal 40 and a detecting circuit 41 is inputted to the comparing circuit 23.

An output of the photodiode 2 is supplied to an input terminal 30 through the head amplifier 6 in FIG. 1. An output of the variable gain amplifier 31 is outputted from the output terminal 34 and is also supplied to the detecting circuit 32. In the detecting circuit 32, an output signal level of the variable gain amplifier 31 is detected. An output of the detecting circuit 32 is supplied to the comparing circuit 33. The reproduction RF signal which was transmitted through the terminal 40 and the detecting circuit 41 is inputted to the comparing circuit 33.

An output level of the detecting circuit 22 and a reproduction RF signal level are compared by the comparing circuit 23. In accordance with a comparison output, a gain of the variable gain amplifier 21 is controlled. Due to this, the output signal level on the photodiode 1 side which is outputted from the output terminal 24 is controlled in accordance with the reproduction RF signal level.

An output level of the detecting circuit 32 and the reproduction RF signal level are compared by the comparing circuit 33. In accordance with a comparison output, a gain of the variable gain amplifier 31 is controlled. Due to this, the output signal level on the photodiode 2 side which is outputted from the output terminal 34 is controlled in accordance with the reproduction RF signal level.

Accordingly, the output signal level on the photodiode 1 side and the output signal level on the photodiode 2 side are normalized so as to be equal. As mentioned above, a pit component included in the output signal on the photodiode 1 side and a pit component included in the output signal on the photodiode 2 side are substantially equalized and a pit signal component is hardly included in the wobble signal component which is obtained from the subtracting circuit 11.

It is sufficient that a frequency band as a target of the normalization covers a frequency of the wobble signal, for example, a frequency of 22.05 kHz.

According to the invention, the outputs of the two photodiodes 1 and 2 which construct the two-divided detector are normalized by the normalizing circuits 8 and 9. Therefore, the pit component included in the output signal on the photodiode 1 side and the pit component included in the output signal on the photodiode 2 side are almost equal. When a subtraction is performed between those signals by the subtracting circuit 11, the pit components are cancelled. Due to this, the pit signal components are hardly included in the wobble signal components which are outputted from the output terminal 13.

What is claimed is:

1. A signal detecting method of detecting additional information of an optical disc which was wobble recorded on a track, comprising the steps of:

adding outputs of first and second photodetectors divided in the tangential direction of said track, thereby obtaining a reproduction RF signal;

normalizing said outputs of said first and second photodetectors by said RF signal so as to reduce an influence by a recording signal; and performing a subtraction between normalized outputs of said first and second photodetectors, thereby obtaining said additional information of the optical disc which was wobble recorded.

2. The signal detecting method according to claim 1, wherein said normalizing step comprises the steps of:

detecting said reproduction RF signal;

performing gain control of outputs of said first and second photodetectors, respectively;

detecting the levels of said outputs of said gain control, respectively;

comparing said detected levels and the level of said reproduction RF signal, respectively; and controlling outputs of said first and second photodetectors on the basis of an output of the comparison.

3. The signal detecting method according to claim 1, wherein said optical disc is a CD-R disc.

4. A signal detecting apparatus to detect additional information of an optical disc which was wobble recorded on a track, comprising:

first and second photodetectors divided in the tangential direction of said track;

adding means for adding outputs of said first and second photodetectors, thereby obtaining a reproduction RF signal;

first and second normalizing means for normalizing said outputs of said first and second photodetectors by said reproduction RF signal so as to reduce an influence by a recording signal; and subtracting means for performing a subtraction between said outputs of said first and second photodetectors normalized by said first and second normalizing means, thereby obtaining said additional information of the optical disc which was wobble recorded.

5. The signal detecting apparatus according to claim 4, further comprising first detecting means for detecting said reproduction RF signal, said first and second normalizing means comprising:

first and second variable gain means for performing gain control of said outputs of said first and second photodetectors, respectively;

second and third detecting means for detecting outputs of said first and second variable gain means, respectively; and first and second comparing means for comparing outputs of said second and third detecting means and an output of said first detecting means.

6. The signal detecting apparatus according to claim 4, wherein said optical disc is a CD-R disc.

\* \* \* \* \*

UNITED STATES PATENT AND TRADEMARK OFFICE
CERTIFICATE OF CORRECTION

PATENT NO.: 5,459,706
DATED: October 17, 1995
INVENTOR(S): HIROSHI OGAWA; SHINICHIRO IIMURA It is certified that error appears in the above-indentified patent and that said Letters Patent is hereby corrected as shown below:

Title page, item 54 and Column 1, lines 1 and 2 should read :

--METHOD AND APPARATUS FOR DETECTING AN ADDRESS
SIGNAL FROM A WOBBLED OPTICAL DISC TRACK--

Signed and Sealed this

Twentieth Day of February, 1996

Attest:

BRUCE LEHMAN

Attesting Officer     Commissioner of Patents and Trademarks